(12) United States Patent
Dunne et al.

(10) Patent No.: US 6,856,793 B2  
(45) Date of Patent: Feb. 15, 2005

(54) METHOD AND APPARATUS FOR MEASURING OUTPUT POWER OF DEVICES FOR MOBILE COMMUNICATIONS

(75) Inventors: David Dunne, Edinburgh (GB); Gabor Zoka, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 671 days.

(21) Appl. No.: 09/963,865

(22) Filed: Sep. 25, 2001

(65) Prior Publication Data

US 2002/0072334 A1 Jun. 13, 2002

(30) Foreign Application Priority Data

Sep. 27, 2000 (GB) .............................................. 0023637  
Apr. 30, 2001 (EP) .............................................. 01303926

(51) Int. Cl.[7] ............................................ H04B 17/00
(52) U.S. Cl. ................. 455/115.4; 455/226.4; 455/522
(58) Field of Search ....................... 455/522, 69, 115.1, 455/115.2, 115.3, 115.4, 67.11, 226.1, 226.4, 116, 425, 423, 67.1

(56) References Cited

U.S. PATENT DOCUMENTS

| | | | | | |
|---|---|---|---|---|---|
| 5,974,098 | A | * | 10/1999 | Tsuda | 375/340 |
| 6,008,916 | A | * | 12/1999 | Khaleghi | 398/27 |
| 6,028,894 | A | * | 2/2000 | Oishi et al. | 375/227 |
| 6,173,162 | B1 | * | 1/2001 | Dahlman et al. | 455/69 |
| 2001/0012765 | A1 | * | 8/2001 | Noreus et al. | 455/69 |
| 2002/0086682 | A1 | * | 7/2002 | Naghian | 455/456 |

FOREIGN PATENT DOCUMENTS

| | | | | |
|---|---|---|---|---|
| GB | 2325989 | * | 6/1997 | G01R/29/06 |
| GB | 2 325 989 | | 12/1998 | |

* cited by examiner

Primary Examiner—Tilahun Gesesse

(57) ABSTRACT

The output power of a signal generated by a mobile communications device is measured over a short period of time (e.g. one signal burst), and the data modulation carried by the signal is also determined. The measured power value is adjusted to compensate for variations due to the content of the data modulation. This enables the long-term average power output by the device to be determined more quickly than by averaging the power measured over many successive signal bursts.

13 Claims, 5 Drawing Sheets

METHOD AND APPARATUS FOR MEASURING OUTPUT POWER OF DEVICES FOR MOBILE COMMUNICATIONS

TECHNICAL FIELD

This invention relates to methods and apparatus for measuring the power of a signal such as a radio frequency (r.f.), intermediate frequency (i.f.) or baseband signal, in particular in the case where the power of the signal over a period of time is a function of data being modulated onto the signal during that period of time. The signal may contain entirely random modulation, or may contain a non-random modulation interval within a random modulation interval. The invention is applicable for example to the measurement of the output power of devices used for mobile communications, such as mobile telephone handsets and base stations.

BACKGROUND ART

The rapidly increasing adoption of mobile communications facilities, such as cellular telephone systems, has led to a huge and growing demand for the associated user devices, such as mobile telephone handsets and other mobile stations (MS). Accurate control of the output power of these devices is important both for the quality of service provided by the devices and for minimising potential interference caused to other users of the system. To this end, it is essential that the output power of every device is fully characterised, at multiple power levels, by the manufacturer before shipment to ensure the device is compliant with prescribed performance characteristics. Equally however, the manufacturers desire that these tests should be accomplished as quickly as possible, to minimise delays they introduce into production timescales.

In the case for example of the 8-PSK modulation format used in the Enhanced Data rates for GSM Evolution (GSM/EDGE) system, the relevant European Telecommunications Standards (3GPP TS 05.05, 45.005, 51.010, 11.21 and 51.021) provide for measurements of a variety of parameters including output power. The GSM/EDGE system employs Time Division Multiple Access (TDMA), in which a mobile station is allocated a precise time interval in which to transmit. The short transmission occupying this interval is called a burst. In the GSM/EDGE system a burst can be modulated either with Gaussian Minimum Shift Keying (GMSK) or with 8-Phase Shift Keying (8-PSK). GMSK is a constant-envelope modulation scheme, which means the mobile station transmits at a constant power level for the duration of the burst. 8-PSK is a non-constant-envelope modulation scheme, so the mobile station's output power changes during the burst as a function of the modulating data. Furthermore, when modulated with a continuous stream of random data, the average power of an 8-PSK modulated signal will vary from burst to burst. The relevant standards specify that direct determination of 8-PSK power is to be accomplished by averaging the power measured over many bursts. Alternatively, the standards allow for other unspecified techniques which when applied to a single burst can provide an estimate of long-term average power.

Mobile stations are typically capable of transmitting over a range of specified output power levels. They must also be capable of transmitting at all frequencies in their bands of operation. The standards require that output power is measured for all power levels and at the lowest, mid-point and highest frequencies in each band of operation. This typically results in 40 or 50 test points for each operating frequency band. If direct measurements of output power of 8-PSK modulated signal bursts are made, 100 or more bursts would typically need to be measured at each one of these test points.

It is an object of this invention to reduce overall test time by estimating the carrier power, and equivalently, the long-term average power, from measurement of a single burst while complying with the measurement accuracy requirements.

DISCLOSURE OF INVENTION

According to one aspect of this invention there is provided a method of measuring the output power of a communications device, comprising the steps of:

receiving a signal output by a communications device;

identifying a measurement interval in the signal;

determining data encoded in the modulation over the measurement interval;

deriving, from the data encoded in the modulation, a ratio of carrier power to average power of the signal over the measurement interval;

measuring average power of the signal over the measurement interval; and multiplying the average power measured over the measurement interval by the ratio of carrier power to average power to derive an estimate of carrier power.

The signal may contain an interval of non-random modulation which is either known exactly or which belongs to a finite set of known non-random modulations. In this case, the portion of non-random modulation may be identified as the measurement interval, and the analytic ratio of carrier power to average power for the portion of non-random modulation may be a pre-calculated value for that non-random modulation. Where there is a set of known non-random modulations, a pre-calculated table may be provided containing values of power ratio for different portions of non-random modulation in the signal, the specific portion of non-random modulation contained in the measurement interval may be identified, and the corresponding pre-calculated value of power ratio selected from the table in accordance therewith.

According to another aspect of this invention there is provided apparatus for measuring the output power of a communications device, comprising:

a receiver for receiving a signal output by a communications device;

a measurement interval identifier for identifying a measurement interval in the signal;

a demodulator for determining data encoded in the modulation over the measurement interval;

a power measurement device for measuring average power of the signal over the measurement interval; and a device for deriving, from the data encoded in the modulation, a ratio of carrier power to average power of the signal over the measurement interval, and for multiplying the average power measured over the measurement interval by the ratio of carrier power to average power to derive an estimate of carrier power.

BRIEF DESCRIPTION OF DRAWINGS

A method and apparatus in accordance with this invention, for estimating carrier power (and equivalently long-term average power) of an 8-PSK modulated r.f signal produced by a GSM/EDGE mobile handset, will now be described, by way of example, with reference to the accompanying drawings, in which.

BEST MODE FOR CARRYING OUT THE INVENTION, & INDUSTRIAL APPLICABILITY

The invention is described below in the context of 8-PSK r.f power measurement of a GSM/EDGE mobile station, by way of illustration. However, it is applicable in other circumstances, such as the measurement of 8-PSK r.f. power of mobile phone base stations.

Figure 1:
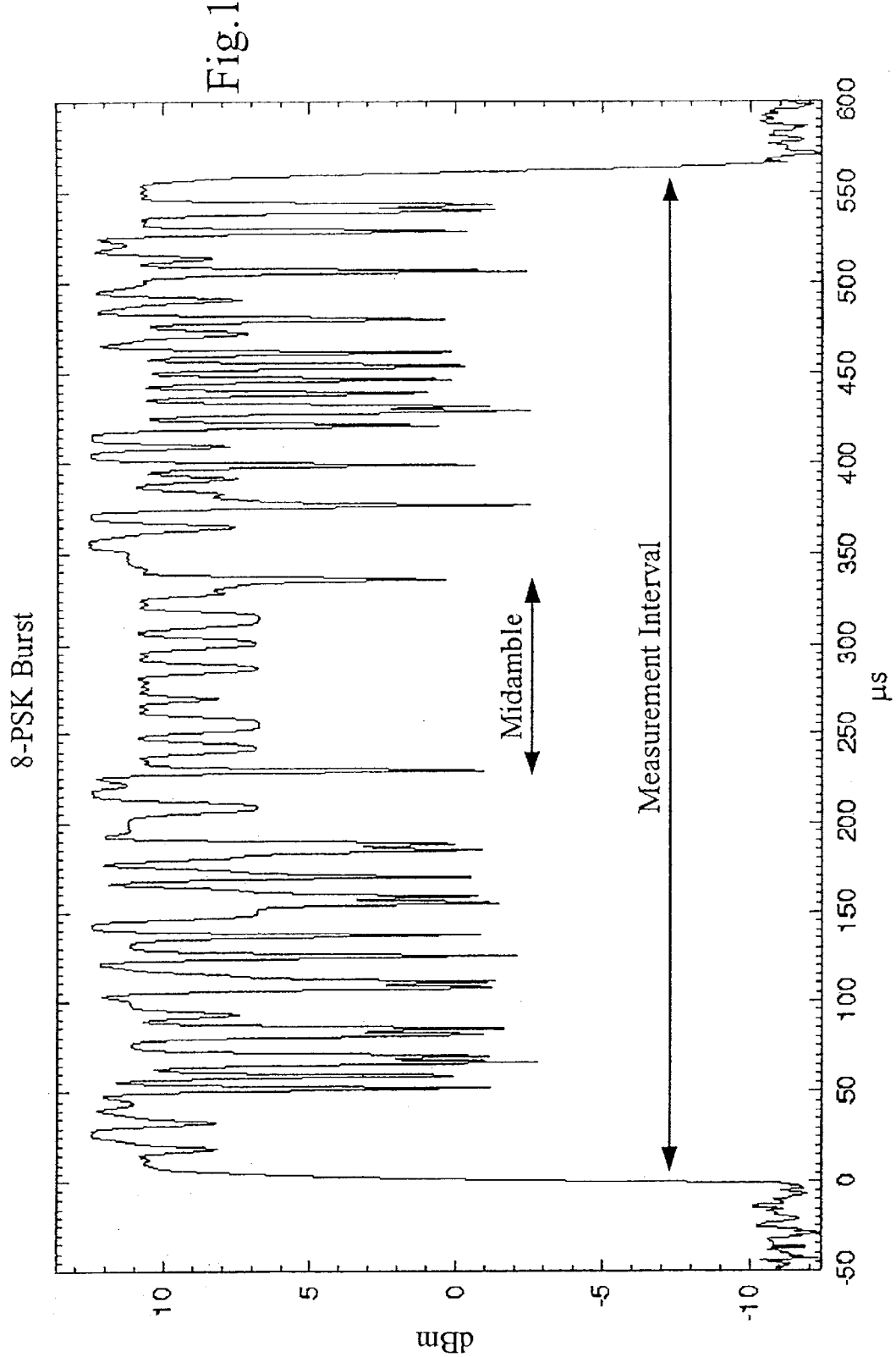
FIG. 1 is a graph showing the instantaneous power in an 8-PSK modulated burst as a function of time when the burst contains a midamble (a non-random part) but is otherwise randomly modulated.

As noted above, the GSM/EDGE system uses TDMA to enable multiple users to share a single channel. In a TDMA system a mobile station is allocated a precise time interval in which to transmit an r.f. burst. If the burst is 8-PSK modulated, the instantaneous power level during the burst is a function of the data being transmitted. Furthermore, if the signal is modulated by random data, the average burst power will vary from one burst to another. The relevant standards specify that 8-PSK power is to be determined by averaging burst power over many bursts. This measure is referred to as the "long-term average" power. FIG. 1 illustrates how the instantaneous power of an 8-PSK modulated burst varies over the duration of the burst. The non-random midamble, which is modulated with a fixed (non-random) data pattern to assist receiver operation, and the measurement interval specified by the standards are identified.

Figure 2:
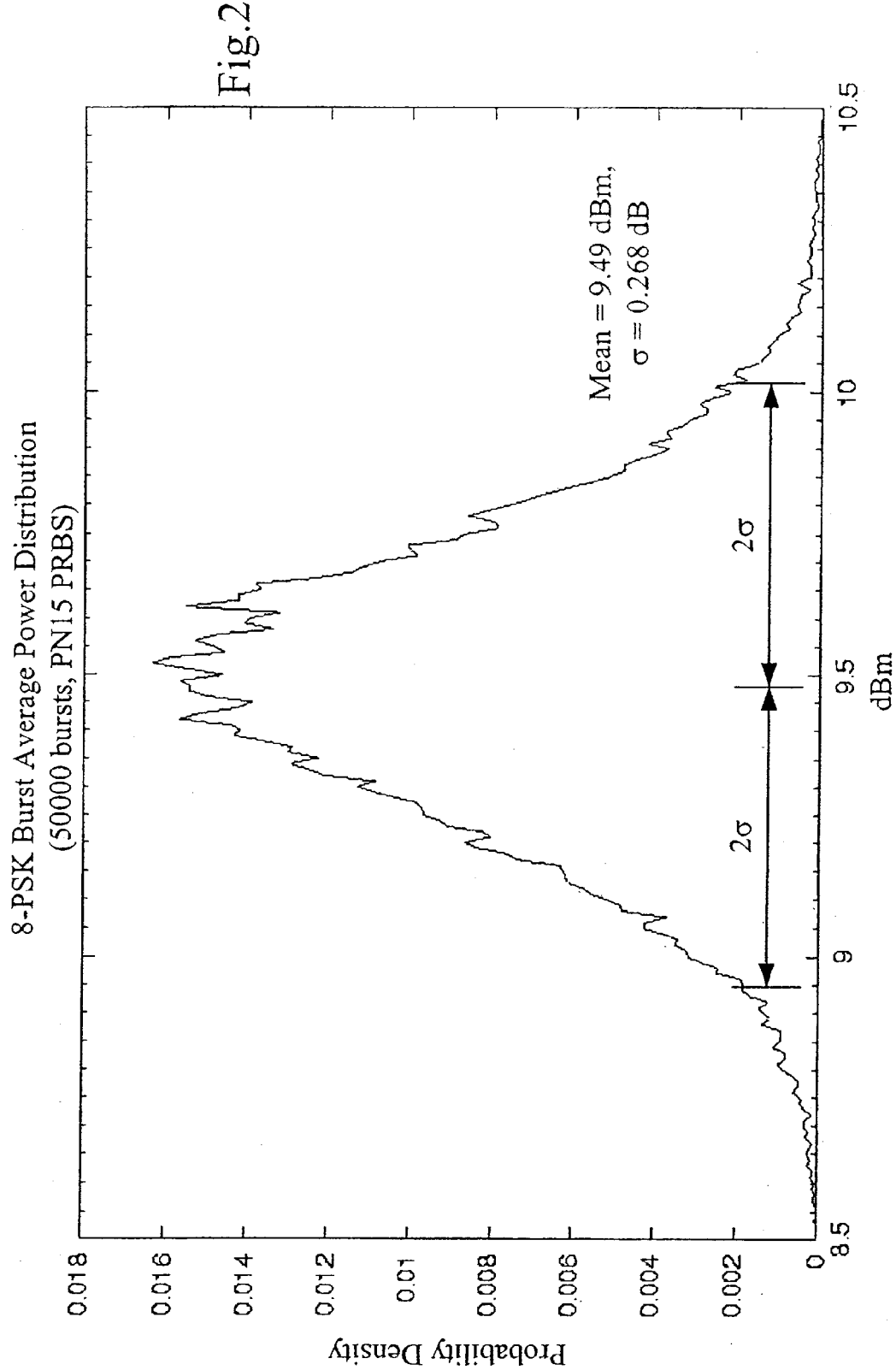
FIG. 2 is a graph showing the distribution of burst average powers for an 8-PSK modulated signal with random data.

FIG. 2 illustrates the distribution of burst average powers that would be measured by a power meter without error in the case of a signal modulated with a Pseudo Random Bit Sequence (PRBS). By definition, the average value of this distribution will converge on the long-term average specified by the standards if sufficient samples are taken. The standards specify all test equipment measurement uncertainties with a 95% confidence range, which for a gaussian distribution corresponds to two standard deviations; the distribution in FIG. 2 (and that in FIG. 3 discussed below) is approximately gaussian. It should be noted that the specific value of standard deviation in the distribution of FIG. 2 (and in that of FIG. 3 discussed below) is a function of the Automatic Leveling Loop (ALC) bandwidth in the device generating the 8-PSK signal.

Referring to FIG. 2, if a single burst power measurement were used as an estimate of the long-term average power, the 95% confidence range would be +/−0.54 dB for a power meter without error. If the inherent inaccuracy of the power meter were +/−0.5 dB, the total measurement accuracy in estimating the long-term average based on a single burst would be +/−1.04 dB.

Test equipment measurement uncertainties are important to mobile station manufacturers. The more uncertainty there is in the test equipment, the less margin there is available for the mobile station to have passed the test despite unit-to-unit variation in the mobile station's operating characteristics. In the current example, the manufacturer may choose to average the power measurement over 10 bursts. The inherent accuracy of the power meter would remain unchanged, but the error contribution from estimating long-term average from a (larger) finite number of average burst powers would reduce to +/−0.17 dB. The overall measurement inaccuracy would then be +/−0.67 dB.

Although this improvement in overall measurement inaccuracy is desirable to the mobile station manufacturer because it results in higher yields, it also results in increased test times which have an associated cost and which it is preferable to at least reduce.

Figure 3:
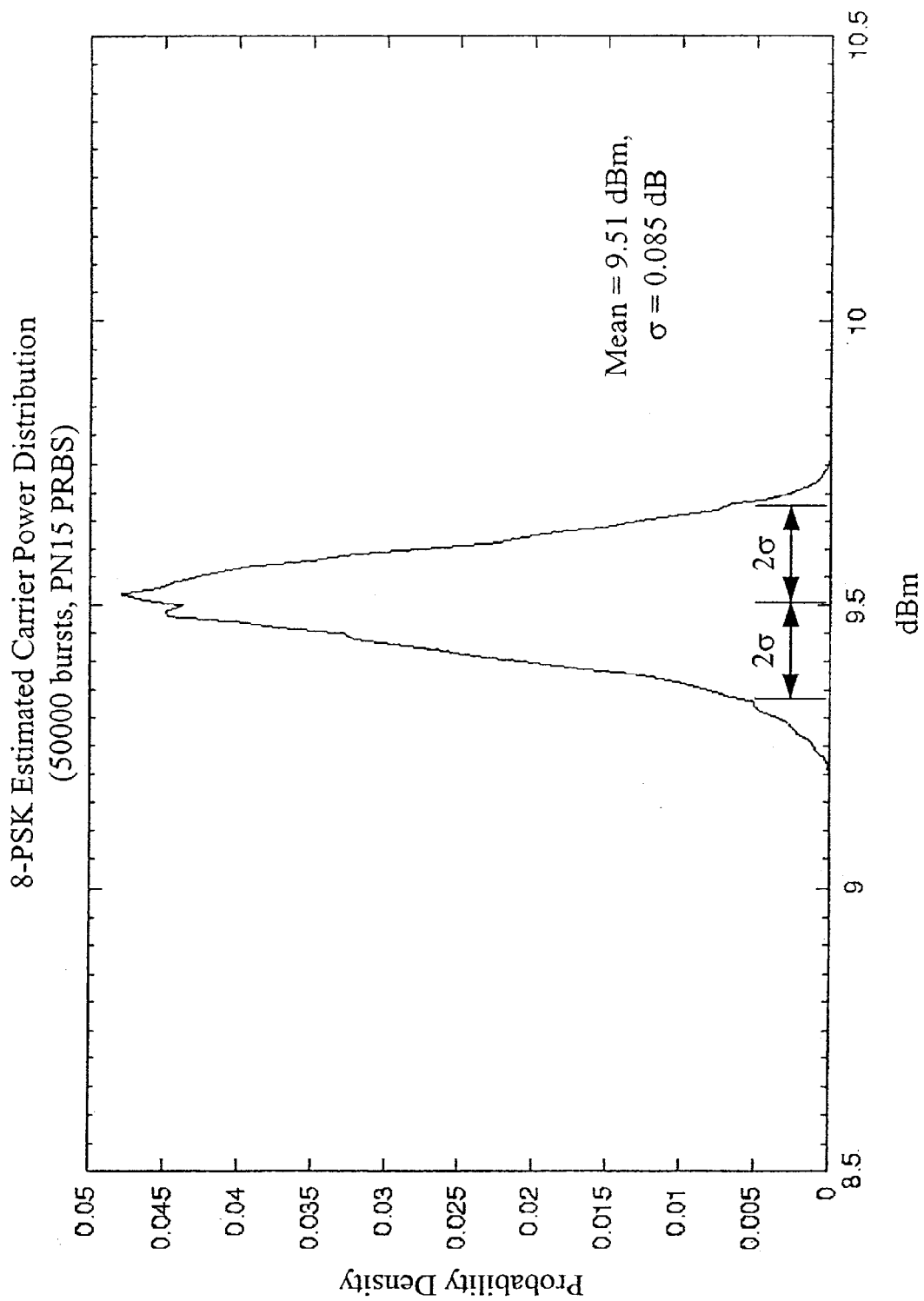
FIG. 3 is a graph showing the distribution of estimated carrier powers for an 8-PSK modulated signal with random data.

FIG. 3 illustrates the distribution of estimated carrier powers that would be obtained from a single burst, using the present invention, by a power meter without error for a signal modulated by a PRBS. It is noted that the mean value of this distribution is equal (with a small error of 0.02 dB) to the mean value of the burst power distribution shown in FIG. 2, this being the long-term average power. This is because in the case of 8-PSK the ratio of the long-term average power to the carrier power (Pi/Pc) is one. The 95% confidence range for this distribution is +/−0.17 dB. In the example where the inherent power meter inaccuracy is +/−0.5 dB, the overall measurement inaccuracy would then be +/−0.67 dB (the same as for a measurement averaged over 10 bursts as described above).

Using the methods and apparatus of this invention provides an estimation of 8-PSK long-term average power that maintains the accuracy of the conventional measurement method, but completes the measurement with fewer measurement steps. Even with the additional processing time required to compute the estimated carrier power, this invention is capable in its more rigorous version of producing measurements approximately five times faster than the conventional measurement method based on averaging multiple bursts. A variant of the invention which is computationally less intensive is approximately ten times faster than the conventional measurement method based on averaging.

Figure 4:
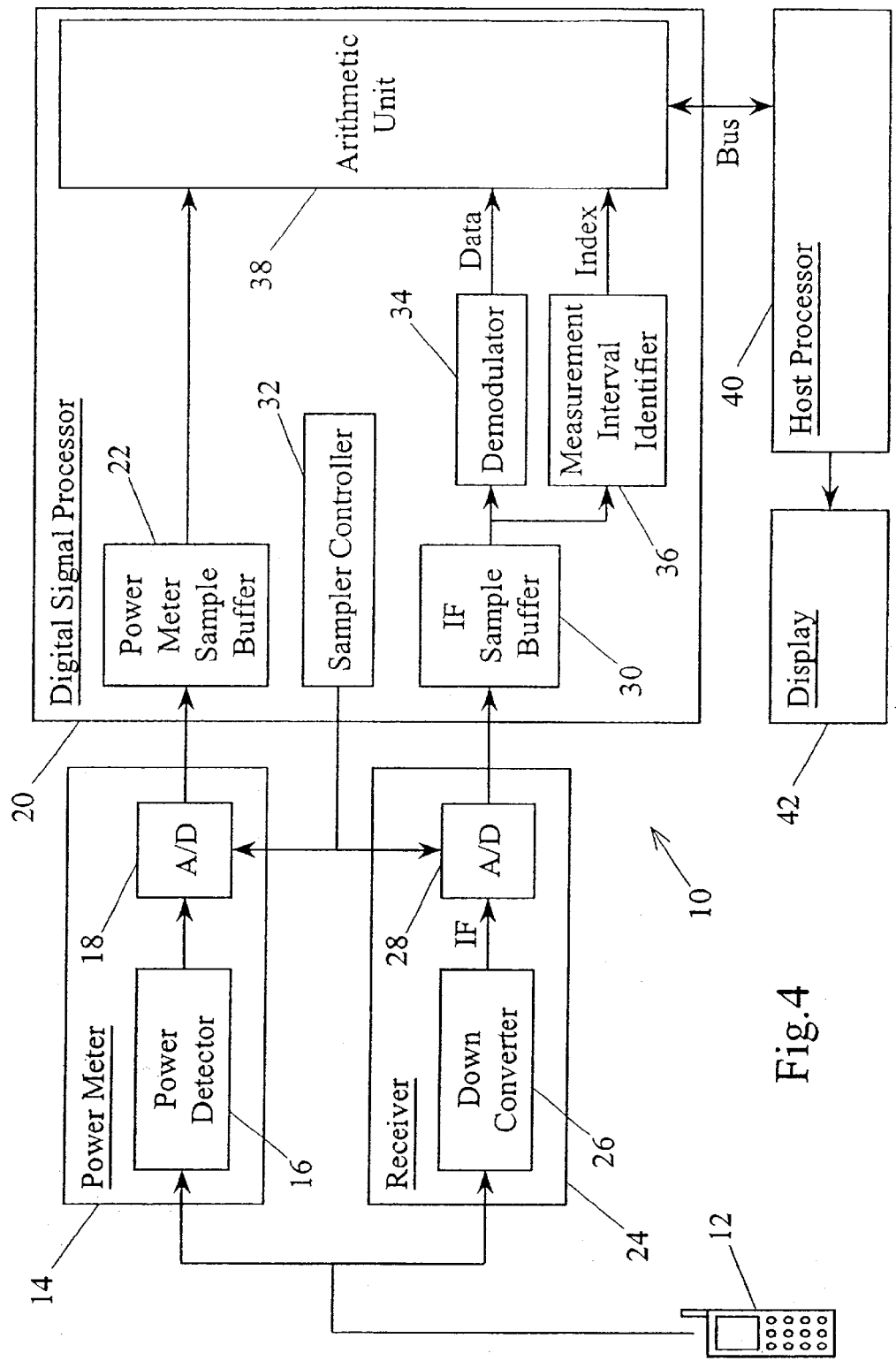
FIG. 4 is a schematic block diagram of apparatus for estimating carrier power (and equivalently long-term average power) of an 8-PSK modulated signal.

FIG. 4 shows a schematic block diagram of measuring apparatus 10 for measuring 8-PSK power using the invention. Referring to FIG. 4, the signal from a mobile station 12 is coupled into the measuring apparatus. This apparatus has two input paths through which the signal is passed. In a first (Power Meter) path 14 the r.f. power is detected or converted into a power envelope signal by a detector 16. The envelope signal is converted into a digital representation by an analogue-to-digital (A/D) converter 18, and this digital representation of the r.f signal power is passed to a digital signal processor (DSP) 20 where it is held in a power meter sample buffer 22 as a time-domain record of instantaneous powers. In a second (Receiver) path 24 the r.f. signal is converted to an i.f. signal by a down converter 26. The i.f. signal is converted into a digital representation by a second A/D converter 28, and this digital representation (of the r.f. signal) is passed to the DSP 20 where it is stored in an IF sample buffer 30.

The A/D converter 18 in the Power Meter 14 and the A/D converter 28 in the Receiver 24 must be triggered at the same time to ensure both paths sample the same interval of the signal. The signals in both paths are sampled over an extended period to ensure that the prescribed measurement interval is captured in both sample records. A sampler controller 32 in the DSP 20 co-ordinates these functions. The DSP 20 also contains a demodulator 34 and a measurement interval identifier 36 (whose functions are described below), and an arithmetic unit 38 for performing the computations required to implement the power estimation method.

The arithmetic unit 38 communicates via a control and data bus with a host processor 40 which co-ordinates the overall operation of the measuring apparatus 10. The power measurements produced by the apparatus 10 are output by the host processor 40 on a display unit 42.

Figure 5:
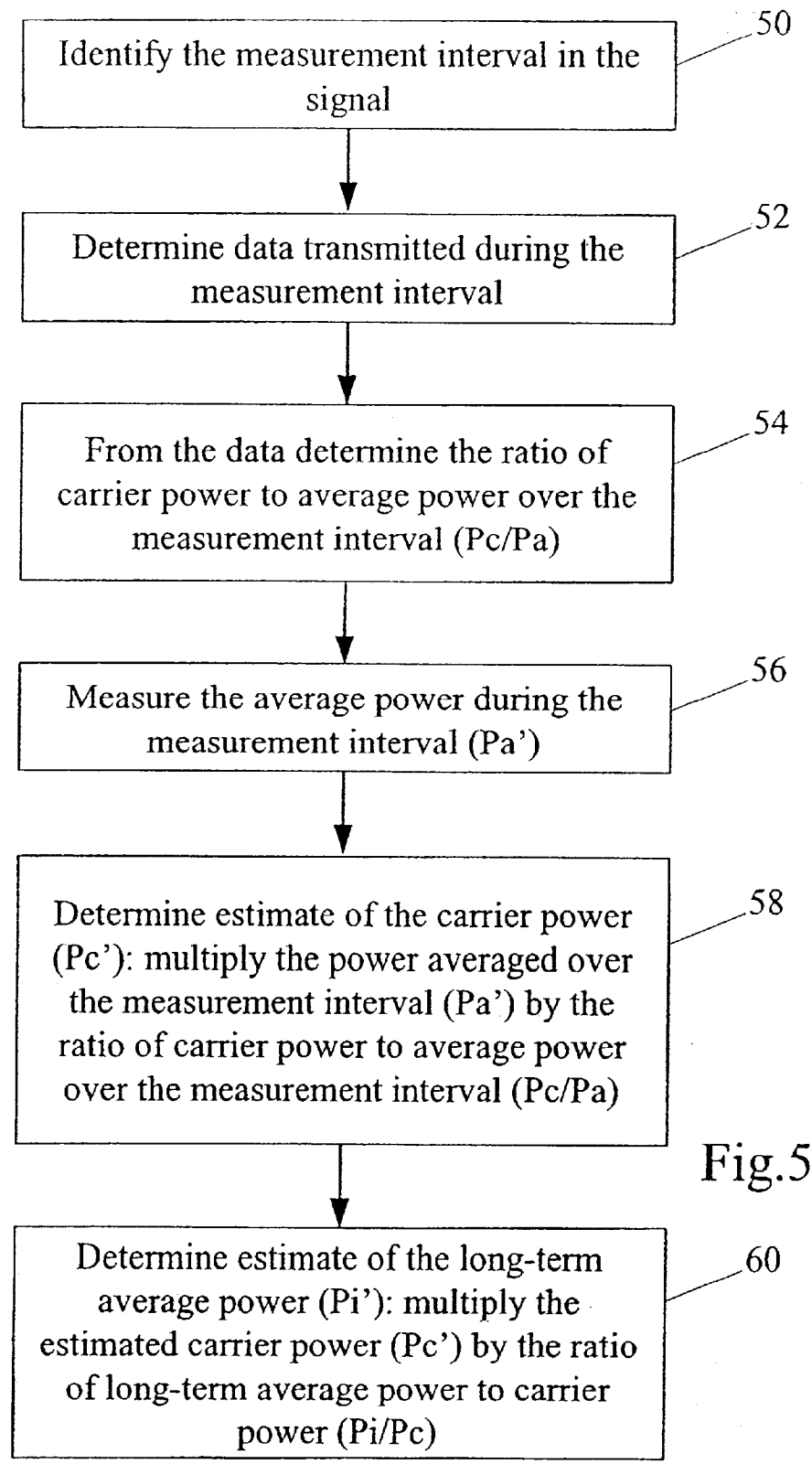
FIG. 5 is a flow chart showing a procedure implemented by a digital signal processor forming part of the apparatus of FIG. 4.

FIG. 5 shows the principal steps in the procedure implemented by the DSP 20 to estimate the carrier power (and equivalently the long-term average power) using the more rigorous variant of the method. At a first step 50 the required measurement interval is identified in the time domain records held in both sample buffers 22 and 30. In the case of 8-PSK modulation, the measurement interval is defined by reference to the midamble (see FIG. 1). The measurement interval identifier 36 finds the midamble pattern in the samples stored in the IF sample buffer 30. Having determined the location of the midamble, the position of the measurement interval in the sample record of the digitised r.f. signal can be found, extending an appropriate number of samples before and after the samples comprising the midamble.

The measurement interval can be described in terms of a range of values of an index to the contents of the sample buffers 22 and 30. Because the A/D converter 18 in the Power Meter path 14 is triggered at the same time as the A/D converter in the Receiver path 24, the index values for the measurement interval derived for the IF sample buffer 30 can also be applied to the power meter sample buffer 22, and thus the measurement interval in the power meter sample buffer 22 is determined. If there is a significant difference in signal propagation delays as between the power meter and receiver paths 14 and 24, an appropriate compensation must be made.

The measurement interval having been identified, at step 52 the demodulator 34 determines the data transmitted by the mobile station during the prescribed measurement interval, by demodulating the signal samples comprising that interval. The demodulated data are passed to the arithmetic unit 38 which synthesises the ideal modulated signal from the demodulated data assuming a predetermined (e.g. unit) carrier power. With an assumption of unit carrier power, the ratio of carrier power to average power (Pc/Pa) can be determined by the arithmetic unit 38 by taking the reciprocal of the average power of this ideal signal.

Using the signal samples from the power meter sample buffer 22, at step 56 the arithmetic unit 38 determines the average power of the signal over the measurement interval (Pa').

The estimated carrier power Pc' (and equivalently the estimated long-term average power) is finally determined at step 58 by multiplying the average power of the signal over the measurement interval (Pa') by the ratio of carrier power to signal power over the measurement interval (Pc/Pa). The corresponding estimate of long-term average power (Pi') is determined at step 60 by multiplying the estimated carrier power (Pc') by the ratio of the long-term average power to the carrier power (Pi/Pc), which is a constant value for a given modulation format. In the case of 8-PSK the ratio of the long-term average power to the carrier power (Pi/Pc) is one.

As mentioned above, a variant of this method is somewhat less rigorous, but even faster. In this variant, the measurement interval identifier 36 proceeds as before by locating the position of the midamble in the IF sample buffer 30. However, the measurement interval identified by reference to the midamble is not in this case the interval prescribed by the standards, but a subinterval comprising the middle 16 symbols of the midamble. The same mechanism as described above is used to cross-index between the sample buffers 22 and 30 and identify the corresponding measurement interval samples in the power meter sample buffer 22.

This variant enables the ratio of carrier power to average power (Pc/Pa) over the measurement interval to be pre-calculated, because the data content of the measurement interval (the fixed midamble symbols) is known beforehand. A table that contains this ratio for each of the eight possible midamble subintervals can be constructed and saved in the memory of the arithmetic unit. This avoids the need to calculate this ratio for each individual measurement and results in even faster measurement speeds than the more rigorous method described previously.

Having identified the actual midamble in the signal being measured and obtained the corresponding ratio of carrier power to signal power (Pc/Pa) over the measurement interval from the pre-calculated table, the variant method proceeds in the same manner as described above, except that the average power of the signal (Pa') is determined over the subinterval of the midamble.

The apparatus shown in FIG. 4 has two separate paths 14 and 24 to process the signal being measured, with the power detector 16 in one path to measure the r.f. power directly. This arrangement produces optimum power measurement accuracy. An alternative arrangement uses only the Receiver path 24, and measures the power of the i.f signal. In such an arrangement extra care must be taken to establish and maintain calibration of the Receiver path 24 for making absolute power measurements.

What is claimed is:

1. A method of measuring the output power of a communications device, comprising the steps of:
   receiving a signal output by a communications device;
   identifying a measurement interval in the signal;
   determining data encoded in the modulation over the measurement interval;
   deriving, from the data encoded in the modulation, a ratio of carrier power to average power of the signal over the measurement interval;
   measuring average power of the signal over the measurement interval; and
   multiplying the average power measured over the measurement interval by the ratio of carrier power to average power to derive an estimate of carrier power.

2. The method of claim 1, including the step of multiplying the estimate of carrier power by the ratio of average power to carrier power to derive an estimate of long-term average power.

3. The method of claim 1, wherein the measurement interval contains at least one portion of random modulation and the ratio of carrier power to average power is determined by synthesising an ideal modulated signal from the data encoded in the modulation, assuming a predetermined carrier power.

4. The method of claim 1, wherein the signal contains at least one portion of non-random modulation, and wherein:
   the portion of non-random modulation is identified as the measurement interval; and
   the ratio of carrier power to average power for the portion of non-random modulation is a pre-calculated value for that non-random modulation.

5. The method of claim 4, wherein a pre-calculated table contains values of power ratio for different portions of non-random modulation in the signal, the specific portion of non-random modulation contained in the measurement interval is identified, and the corresponding pre-calculated value of power ratio is selected from the table in accordance therewith.

6. The method of claim 1, wherein the signal is a GSM/EDGE signal and the measurement interval is identified by reference to a midamble in the GSM/EDGE signal.

7. The method of claim 6, wherein the measurement interval is identified by reference to sixteen middle symbols of the midamble.

8. The method of claim 1, wherein a first signal path is used for determining the data encoded in the modulation over the measurement interval, and a second signal path is used for measuring the average power of the signal over the measurement interval.

9. Apparatus for measuring the output power of a communications device, comprising:
   a receiver for receiving a signal output by a communications device;
   a measurement interval identifier for identifying a measurement interval in the signal;
   a demodulator for determining data encoded in the modulation over the measurement interval;
   a power measurement device for measuring average power of the signal over the measurement interval; and
   a device for deriving, from the data encoded in the modulation, a ratio of carrier power to average power of the signal over the measurement interval, and for multiplying the average power measured over the measurement interval by the ratio of carrier power to average power to derive an estimate of carrier power.

10. The apparatus of claim 9, wherein the device is also arranged to multiply the estimate of carrier power by the ratio of average power to carrier power to derive an estimate of long-term average power.

11. The apparatus of claim 9, including a store for storing at least one pre-calculated ratio of carrier power to average power for a portion of non-random modulation in the signal.

12. The apparatus of claim 11, wherein the store contains values of power ratio for different portions of non-random modulation in the signal.

13. The apparatus of claim 9, including a first signal path for determining the data encoded in the modulation over the measurement interval, and a second signal path for measuring the average power of the signal over the measurement interval.

* * * * *